United States Patent [19]

Baetz

[11] 3,925,396
[45] Dec. 9, 1975

[54] β-PYRIDYL-CARBONAMIDO-ALKANE-SULFONIC ACID SALTS

[75] Inventor: Jacques Baetz, La Garenne-Colombes, France

[73] Assignee: Seperic, Morat, France

[22] Filed: Jan. 31, 1974

[21] Appl. No.: 438,368

[30] Foreign Application Priority Data
Feb. 15, 1973  United Kingdom............... 7407/73

[52] U.S. Cl...... 260/294.8 F; 424/263; 260/294.8 S
[51] Int. Cl.²................................. C07D 213/82
[58] Field of Search............... 260/294.8 F, 294.8 S

[56] References Cited
UNITED STATES PATENTS
2,458,584  1/1949  Friedman et al............ 260/294.8 F

*Primary Examiner*—Henry R. Jiles
*Assistant Examiner*—Robert W. Ramsuer
*Attorney, Agent, or Firm*—Young & Thompson

[57] ABSTRACT

Said salts are those having the general formula:

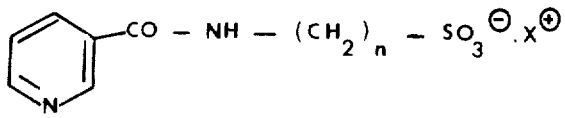

in which $n$ is an integer equal to 2 or 3 and X represents a cation consisting of a hydroxylated or carboxylated nitrogen-containing organic base or an alkali or alkaline-earth metal.

They are therapeutically useful, in particular for their hypolipemic action.

7 Claims, 1 Drawing Figure

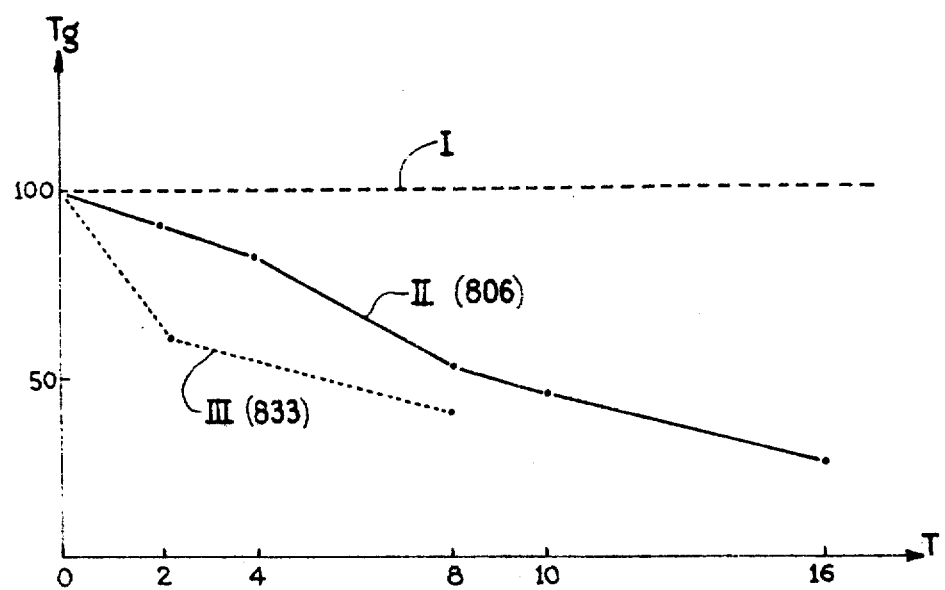

β-PYRIDYL-CARBONAMIDO-ALKANE-SULFONIC ACID SALTS

This invention relates to a series of β-pyridyl-carbonamidoalkane-sulfonic acid salts having therapeutic — particularly hypolipemic — properties. Said compounds are represented by the following general formula:

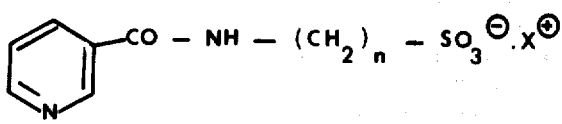

in which $n$ is an integer equal to 2 or 3 and X represents a cation consisting of a hydroxylated or carboxylated nitrogen-containing organic base, or an alkali or alkaline earth metal.

Among such compounds, the preferred compounds are those in which $n = 2$ and X is potassium, magnesium, and particularly choline, betaine, ethanolamine and pyridoxine.

A process for the preparation of said compounds comprises converting a β-pyridyl-carbonamido-alkane-sulfonic acid of the formula

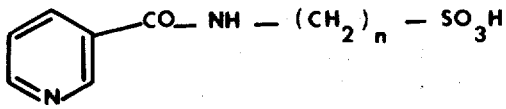

to a salt with the free base corresponding to cation X, or the carbonate or bicarbonate of said cation, $n$ and X having the previously defined meanings.

Conversion to the salt is advantageously conducted within a solvent such as water or a lower alkanol. The reaction proceeds satisfactorily at room temperature, so that heating is of no particular benefit except in those cases where it is desired to promote the dissolution of the reagents by heating at a moderate temperature. When the reaction is complete, a co-solvent in which the salt is insoluble, such as acetone, ether or chloroform may be added to the reaction medium to promote the precipitation of the salt.

The β-pyridyl-carbonamido-alkane-sulfonic acid used as starting material may in turn be prepared by reacting nicotinoyl chloride with an amino-alkane-sulfonic acid $NH_2—(CH_2)_n—SO_3H$ under usual amidification conditions.

The following examples illustrate the invention without, however, limiting same.

EXAMPLE I

Preparation of choline β-pyridyl-carbonamido-ethane sulfonate (General formula: $n = 2$; X = $(CH_3)_3N—CH_2—CH_2OH$. Code No. 800)

Choline bicarbonate (22 g; choline base content: 58.3%) is dissolved in ethanol (120 ml). β-Pyridyl-carbonamido-ethane sulfonic acid (25 g) is gradually added thereto, with stirring. When no more carbon dioxide is evolved, the reaction mixture is filtered. The filtrate is evaporated to dryness in vacuo and is then taken up into ethanol. Acetone (200 ml) is then slowly added thereto, with stirring, upon which crystallization begins. The material is stirred during one hour, after which it is filtered and washed with 2 × 35 ml acetone. It is then dried in vacuo, to give 32 g of product, m.p. = 83–86°C.

| Analysis: | Calculated | Found |
|---|---|---|
| C% | 16.83 | 46.67 |
| H% | 6.95 | 6.89 |
| N% | 12.60 | 12.54 |
| S% | 9.62 | 9.45 |

EXAMPLE II

Preparation of betaine β-pyridyl-carbonamido-ethane sulfonate (General formula: $n = 2$; X = $(CH_3)_3N—CH_2—COOH$. (Code No. 806)

Betaine (7 g) and methanol (100 ml) are added in a flask provided with a heating device and a mechanical stirring device. β-Pyridyl-carbonamido-ethane-sulfonic acid (12 g) followed by chloroform (100 ml) and methanol (500 ml) are then gradually added thereto, with stirring. The reaction mixture is refluxed and is then filtered. The filtrate is concentrated to a volume of about 100 ml, after which crystallization begins. The material is allowed to stand overnight in the refrigerator. It is then suction filtered, washed with 2 × 8 ml methanol and dried over potassium hydroxide, to give 13 g of product, m.p. 210°–212°C.

| Analysis: | Calculated | Found |
|---|---|---|
| C% | 44.94 | 44.88 |
| H% | 6.09 | 6.07 |
| O% | 27.63 | 27.76 |
| N% | 12.10 | 12.11 |
| S% | 9.23 | 9.18 |

EXAMPLE III

Preparation of magnesium bis-(β-pyridyl-carbonamido-ethane-sulfonate)

(General formula: $n = 2$; X = Mg . Code No. 833)

β-Pyridyl-carbonamido-ethane-sulfonic acid (12 g) and water (7 ml) are mixed with mechanical stirring. Total dissolution is obtained. Magnesium carbonate (2.2 g) is added to the mixture which is then warmed to dissolve, after which ethanol (250 ml) and ether (100 ml) are added thereto. Crystallization occurs. The resulting material is left two hours in the refrigerator, after which it is suction filtered and washed with 2 × 20 ml ether. It is then dried over potassium hydroxide and then in an oven at 105°C during 3 hours, to give 13 g of product, m.p. = 365°C.

| Analysis: | Calculated | Found |
|---|---|---|
| N% | 11.6 | 11.53 |
| Mg% | 5.03 | 4.67 |

EXAMPLE IV

Preparation of choline β-pyridyl-carbonamido-propane sulfonate (General formula: $n = 3$; $X = (CH_3)_3N-CH_2-CH_2OH$. Code No. 844).

An aqueous choline bicarbonate solution (9 g; choline base content: 58.3 percent) is mixed with methanol (50 ml), with stirring. Under continued stirring, β-pyridyl-carbonamido-propane sulfonic acid (10 g) is gradually added thereto. The methanol is removed and the residue is taken up into 2 × 50 ml ethanol. Acetone (30 ml) is added to the resulting oil, with stirring. Crystallization begins. A further amount of acetone (20 ml) is added and the resulting material is allowed to stand 48 hours in the refrigerator. It is then suction filtered, washed with 2 × 10 ml acetone and dried over potassium hydroxide, to give 11 g of product, m.p. = 83°–84°C.

| Analysis: | Calculated | Found |
|---|---|---|
| N% | 12.09 | 11.81 |

EXAMPLE V

Preparation of betaine β-pyridyl-carbonamido-propane sulfonate (General formula: $n = 3$; $X = (CH_3)_3N-CH_2-COOH$. Code No. 845)

Betaine (5.2 g) is added to methanol (80 ml), with stirring. β-Pyridyl-carbonamido-propane sulfonic acid (10 g) is then gradually added to the resulting solution, followed by methanol (80 ml), after which the resulting material is refluxed. It is then concentrated in vacuo to incipient crystallization. Ethanol (20 ml) is added thereto and the resulting material is allowed to stand 2 hours in the refrigerator. It is then suction filtered, washed with ethanol (15 ml) and dried over potassium hydroxide, to give 12 g of product, m.p. = 167°C.

| Analysis: | Calculated | Found |
|---|---|---|
| N% | 11.62 | 11.75 |

EXAMPLE VI

Preparation of magnesium bis-(β-pyridyl-carbonamido-propane-sulfonate)

(General formula: $n = 3$; $X = Mg$. Code No. 952)

β-Pyridyl-carbonamido-propane-sulfonic acid (10 g) is dissolved in water (5 ml). Magnesium carbonate (2 g) is added thereto with mild heating. To the resulting mixture are then added ethanol (200 ml) and ether (100 ml). The material is allowed to rest 3 hours at 0°C, after which it is suction filtered and washed with ether. It is then dried over potassium hydroxide and then in an oven at 105°C, during 4 hours, to give 11 g of product, m.p. > 300°C.

| Analysis | Calculated | Found |
|---|---|---|
| N% | 11.27 | 11.19 |
| Mg% | 4.76 | 4.90 |

EXAMPLE VII

Preparation of potassium β-pyridyl-carbonamido-ethane sulfonate (General formula: $n = 2$; $X = K$. Code No. 1,000)

β-Pyridyl-carbonamido-ethane-sulfonic acid (23 g) is dissolved in water (30 ml) and potash lye ($d = 1.38$) is then added thereto.

The resulting material is adjusted at pH 7 and is then concentrated to a maximum with a rotary evaporator. The last traces of water are extracted with a small amount of ethanol. Crystallization begins during the concentration step. The residue is suspended in absolute ethanol (150 ml), iced, suction filtered, dried three times with absolute ethanol and is then finally dried first over potassium hydroxide and then over phosphoric anhydride, to give 26 g of product, m.p. = 280°C.

| Analysis: | Calculated | Found |
|---|---|---|
| N% | 10.44 | 10.30 |
| K% | 14.57 | 14.46 |

EXAMPLE VIII

Preparation of ethanolamine β-pyridyl-carbonamido-ethane sulfonate (General formula: $n = 2$; $X = HO-CH_2-CH_2-NH_3$. Code No. 1,001)

β-Pyridyl-carbonamido-ethane-sulfonic acid (0.1 mole) is dissolved in water. Ethanolamine (0.1 mole) is then added thereto and the resulting mixture is concentrated. The residual water is removed by adding a small amount of ethanol which is then evaporated, said procedure being repeated three times. The resulting crystals are iced, suction filtered, washed with ethanol and dried over potassium hydroxide, to give 22 g of product, m.p. = 96°–98°C.

| Analysis | Calculated | Found |
|---|---|---|
| N% | 14.42 | 14.61 |
| S% | 11.00 | 11.91 |

EXAMPLE IX

Preparation of pyridoxine β-pyridyl-carbonamido-ethane sulfonate (General formula: $n = 2$; $X =$ pyridoxine base. Code No. 1027)

β-Pyridyl-carbonamido-ethane-sulfonic acid (17.25 g) is dissolved in water (45 ml) and pyridoxine base (12.75 g) is then added thereto. The resulting dark yellow solution is concentrated. The residual water is removed with ethanol. The resulting crystals are suction filtered, washed with ethanol and dried over potassium hydroxide, to give 27 g of product, m.p. 138°–140°C.

| Analysis: | Calculated | Found |
|---|---|---|
| N% | 10.52 | 10.54 |
| S% | 8.03 | 8.13 |

The hypolipemic activity of said compounds was evidenced by two series of tests:

1. Inhibitory Action on Triton Induced Hyperlipemia

Rats are administered intravenously 300 mg/kg Triton WR.1339. They are sacrificed six hours later: triglyceridemia assay shows a marked significant increase over the values obtained without Triton. The test materials are administered orally one hour prior to Triton injection. The inhibitory action on the increase of triglycerides is scored using from one to four +'s, ++++ representing maximum inhibition.

The following results are obtained:

| No. | |
|---|---|
| 800 | ++++ |
| 806 | ++++ |
| 833 | ++++ |
| 844 | +++ |
| 845 | ++ |
| 952 | + |
| 1000 | +++ |
| 1001 | +++ |
| 1027 | ++++ |

2. Hypolipemic Action in Normal Rat

Rats which have been kept fasting during 8 hours are given the test materials orally. Samples of the blood of the test animals are taken at various intervals after administration, for the determination of triglycerides. In the accompanying drawing, the single FIGURE exemplifies the hypolipemic action of compounds 806 and 833. In said FIGURE, the time T (in hours) elapsed after administration of the test materials (zero time) is plotted along the abscissa and the triglyceride content (Tg) of the blood of the animals is plotted along the ordinate, in arbitrary units, value 100 being the value observed in the reference animals (curve I) given no test materials. Curves II and III illustrate the action of compounds 806 and 833, respectively.

Since the compounds of this invention are substantially non-toxic, their hypolipemic activity is advantageously applicable in human medicine. In this application, in which they have the advantage of exerting an extended hypolipemic action unaccompanied by any peripheral vasodilatator disorder, they may be administered alone or in the form of mixtures, such as a mixture of betaine salt and of magnesium salt, by the oral or parenteral route. A suitable daily dosage regimen is, for example, from 1 g to 12 g per day, the active ingredient being formulated as orally or parenterally administrable preparations, with the excipients suitable for such routes of administration. Said unit dosage preparations include drinkable ampoules, tablets, capsules and injectable ampoules, each unit dose containing from 1 g to 6 g active ingredient.

Having now described my invention, what I claim as new and desire to secure by Letters Patent is:

1. A β-pyridyl-carbonamido-alkane-sulfonic acid salt having the formula

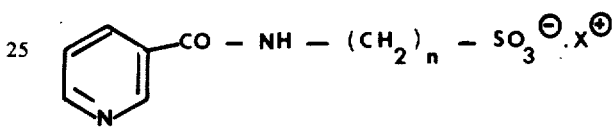

in which $n$ is an integer selected from 2 and 3 and X is a cation selected from choline, betaine, ethanolamine, pyridoxine and the pharmaceutically acceptable alkali and alkaline-earth metals.

2. Choline β-pyridyl-carbonamido-ethane-sulfonate.

3. Betaine β-pyridyl-carbonamido-ethane-sulfonate.

4. Ethanolamine β-pyridyl-carbonamido-ethane-sulfonate.

5. Pyridoxine β-pyridyl-carbonamido-ethane-sulfonate.

6. Magnesium β-pyridyl-carbonamido-ethane-sulfonate.

7. Potassium β-pyridyl-carbonamido-ethane-sulfonate.

* * * * *